United States Patent [19]

Flieger

[11] Patent Number: 5,447,772
[45] Date of Patent: Sep. 5, 1995

[54] RECLOSABLE PACKAGING SEAL AND METHODS RELATING THERETO

[75] Inventor: Hans D. Flieger, Vessy, Switzerland

[73] Assignee: E. I. Du Pont de Nemours and Company, Wilmington, Del.

[21] Appl. No.: 156,595

[22] Filed: Nov. 23, 1993

Related U.S. Application Data

[63] Continuation-in-part of Ser. No. 34,331, Mar. 22, 1993, abandoned, which is a continuation-in-part of Ser. No. 616,388, Nov. 21, 1990, abandoned.

[51] Int. Cl.⁶ .............................................. B32B 3/06
[52] U.S. Cl. ........................................ 428/99; 24/576; 24/587; 220/306; 220/324; 383/63; 383/95; 428/100; 428/131; 428/178; 428/179; 428/180
[58] Field of Search ................. 428/99, 100, 180, 179, 428/178, 131; 24/576, 587; 383/63, 95; 220/306, 324; 229/2.5 R; 264/553, 554, 510, 512

[56] References Cited

U.S. PATENT DOCUMENTS

| | | | |
|---|---|---|---|
| 3,311,229 | 3/1967 | Troll | 206/56 |
| 3,760,940 | 9/1973 | Bustin | 206/58 |
| 5,103,979 | 4/1992 | Hustad | 206/459 |

*Primary Examiner*—Nasser Ahmad

[57] ABSTRACT

The present invention is directed to a resealable bond between two or more overlapping multi-layer film surfaces comprising a plurality of closely spaced, interconnecting indentations. More specifically, the releasable seal of the present invention is directed to the simultaneous embossing of precisely configured indentations, involving multilayer films which can heat seal together during the embossing operation; the resulting seal layer is designed and configured to delaminate and tear when the package is initially opened, while the indentations are designed and configured to re-engage and partially re-seal when the package is later closed.

1 Claim, 2 Drawing Sheets

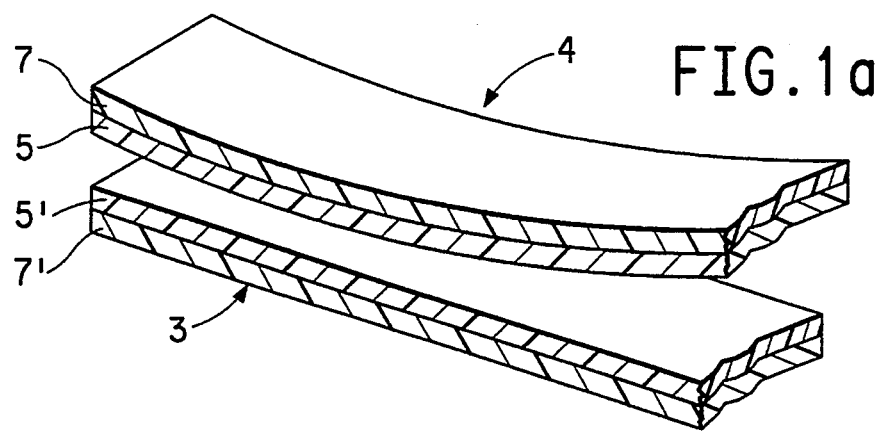
FIG. 1a
FIG. 1b
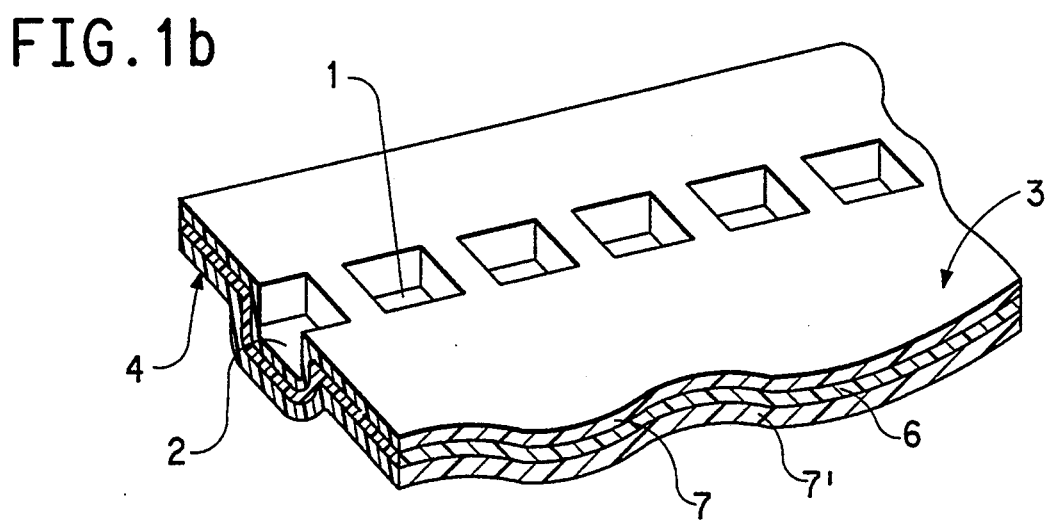
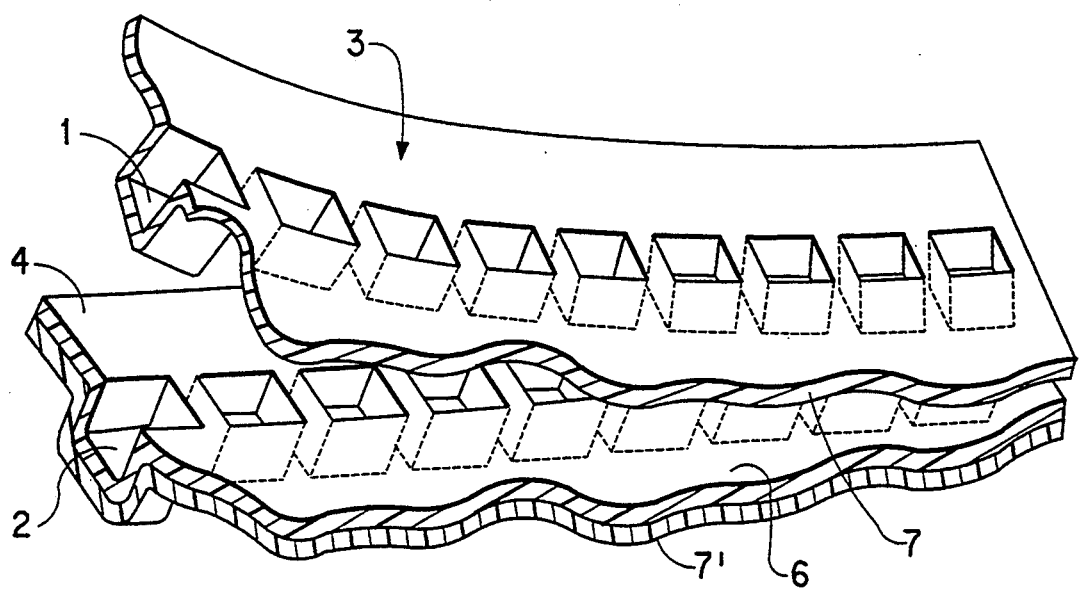
FIG. 1c

RECLOSABLE PACKAGING SEAL AND METHODS RELATING THERETO

This is a continuation-in-part of application Ser. No. 08/034,331, Mar. 22, 1993 now abandoned which is a continuation-in-part of Ser. No. 07/616,388, filed Nov. 21, 1990 now abandoned.

FIELD OF THE INVENTION

The present invention is directed to a resealable bond between two or more overlapping multi-layer film surfaces comprising a plurality of closely spaced, interconnecting indentations. More specifically, the releasable seal of the present invention is directed to the simultaneous embossing of precisely configured indentations, involving multilayer films which can heat seal together during the embossing operation; the resulting seal layer is designed and configured to delaminate and tear when the package is initially opened, while the indentations are designed and configured to re-engage and partially re-seal when the package is later closed.

BACKGROUND OF THE INVENTION

Broadly speaking, resealable plastic packages are known. Such packages include those which use resealable glue. Others use an elongated groove which will releasably engage a complementary channel.

Another general class of releasable seals in plastic packaging involves interconnecting positively and negatively formed members (otherwise referred to as "male" and "female" members). Generally speaking, each member generally is made from the same material and therefore would fuse together initially, if formed while in contact with one another. Such reclosable packages are generally molded as one piece, and the releasable seal is then generally created by folding the molded article, bringing the male and female members together to form the releasable seal. Such a molding operation can be complex and alignment between the male and female members can be difficult. Such releasable seals also generally require the use of complex and expensive machinery.

SUMMARY OF THE INVENTION

The present invention is directed to a releasable seal (or engagement) between two or more multilayer sheets and is created by a simple thermoforming process, involving precisely configured indentations. The sheets generally must be aligned, one on top of the other, and can be the same or different.

Each sheet preferrably comprises a heat seal layer, and the sheets are overlapped in a manner which substantially provides contact between the heat seal layer of each sheet. The overlapping sheets are then heated above their softening temperature and embossed (thermoformed). During the embossing operation, the heat seal layers preferrably fuse and seal together.

The embossing process is conducted by thermoforming a plurality of complementary protrusions along the aligned sheets and thereafter allowing the sheets to cool. The protrusions are preferably made by means of a female die, whereby a small portion of the softened sheets is forced into the die cavity by means of positive pressure from above and/or negative pressure from the bottom of the die cavity; optionally, a complementary male die can be used to force the softened films into the female die cavity.

The resulting thermoformed protrusion is preferably about 5 millimeters in length (and depth) and spaced about 5 millimeters from one another. The resulting closely spaced protrusions, in combination, form an effective releasable seal between the plastic films.

The protrusions can be perpendicular (90°) to the plane of the films, or more preferably, can be angled (less than 90° to the plane of the films). By angling the protrusion, the two films are more difficult to pull apart, since opposing forces on the films (perpendicular to the plane of the films) would cause the inserted (inner film) portion of the angled protrusion to deform as it separated from the receiving (outer film) portion of the angled protrusion.

Other configurations are possible. For example, the protrusions could be angled in different directions, so that sliding one film relative to the other film would not eliminate the need to deform at least some of the film protrusions as the inner film is separated from the outer film.

The protrusions can be cylindrical, square, rectangular, "star" shaped or the like. Generally speaking, the greater the surface area of the protrusions, the greater the sealing ability of the seal, and therefore complex configurations having greater surface areas are more preferred. The female die can be wider at the bottom so that the protrusion is wider at its tip than at the base, thereby further providing a lock-in-place engagement between the two sheets.

The heat seal layers of the present invention can be of any conventional or non-conventional heat sealable material, including ionomer (i.e., ethylene/acrylic acid copolymer or ethylene/methyacrylic acid copolymer, wholly or partially neutralized with a cation, such as sodium or zinc); vinyl ester (i.e., ethylene vinyl acetate); acid copolymer (i.e., ethylene/acrylic acid copolymer or ethylene/methacrylic acid copolymer); ultra low density polyethylene; metalocene or single site catalysis polyethylene; or the like. Heat sealable resins are well known and broadly available commercially.

Critical to the present invention is that the heat seal layer be configured to tear and delaminate upon the opening of the package. To encourage the desired tearing, a notch is preferrably provided to at least the heat seal layer. As the two sheets are pulled apart, the heat seal layer will tend to tear along the notch, and once the tearing begins, the heat seal layer will continue to tear even beyond the notch. As the heat seal layer tears, it should also delaminate from at least one of the films. Preferably, the fused heat seal layers will remain with one of two sheets and delaminate away from the other sheet.

Such delamination can be accomplished by designing one of the sheets with a stronger bond to the heat seal layer than the other sheet. In this respect, it is generally preferred that the two sheets are different, wherein one sheet has a stronger bond to the heat seal layer than the other.

Since heat seal layers often have carboxylic, anhydride, or ester functionality, such heat seal layers generally have less adhesion to nonporous, crystalline, non-polar substrates, relative to more polar, porous or amorphous substrates. Preferred substrates which have relatively low adhesion to many heat seal layers include polyethylene (linear or non-linear, of any density), polyprolyene, and hydrocarbon copolymers thereof. The most preferred substrates have very low glass transition temperatures or are otherwise very "soft" at room temperature; such "soft" substrates or substrate coatings will generally allow for easy delamination.

The non-delaminating film preferably comprises a heat seal layer which is supported by a substrate or coating which has relatively higher bonding or adhesion to the heat seal layer. Such support substrate or coating materials are preferably substantially polar, where such polarity would enhance the bonding between the heat seal layer and the support coating or substrate. Preferred such materials include nylon, polyester and the like.

Furthermore, relatively tough coatings or substrates may also be appropriate, where they have good adhesion to the heat seal layer, regardless of polarity. Tough olefinic homopolymers and copolymers, regardless of polarity may be appropriate in such an application, provided there is relatively stronger bonding relative to the delaminating film.

An important attribute of the present invention is the ability to create the reclosable seal while the object to be ultimately packaged lies between the two sheets. Many conventional reclosable packaging systems require that the package be first manufactured and later filled. Here, a portion of the periphery of the two overlying sheets can be welded or adhered together, and a food item or the like can be inserted between the sheets; thereafter, the reclosable seal of the present invention can be applied to the remaining periphery of the sheets, thereby forming a finished, packaged product.

The reclosable seal of the present invention can be used along more than one edge of the package and hence, the reclosable seal can be opened extensively to expose the packaged object. With many conventional systems, the opening is only along one peripheral edge, and hence, the consumer must generally place a hand into the package, between the two films. In the present invention, the reclosable seal can be placed along three peripheral edges, and the films can be separated to such an extent that the packaged object is freely accessible to the consumer.

Another attribute of the present invention is its simplicity and ease in manufacture. The simple embossing process is far less expensive and complex relative to conventional systems.

DESCRIPTION OF THE DRAWINGS

FIG. 1a is a perspective view of a precursor pair of multilayer films, relating to a preferred embodiment of this invention.

FIG. 1b is a perspective view of the preferred embodiment derived from the films of FIG. 1.

FIG. 1c is a perspective view of the preferred embodiment of FIG. 1b, subsequent to partial opening.

DETAILED DESCRIPTION OF THE PREFERRED EMBODIMENTS AND BEST MODE

Figure 2A:
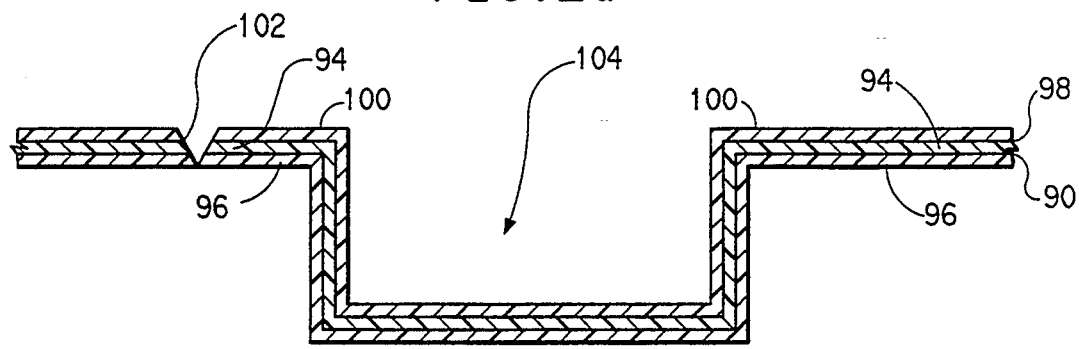
FIG. 2a is a cross-sectional side view of a thermoformed indentation according to the present invention.

The reclosable seals of the present invention can be created by using overlapping films or sheets, 3 and 4 respectively, as illustrated in FIG. 1. The sheets generally must be aligned, one on top of the other, and preferrably are multilayer films comprising support layers 7 and 7' and further comprise a heat seal layer 5 and 5'.

The heat seal layers are preferably aligned in contacting relationship to one another and fused together during the thermoforming process, resulting in a structure as indicated generally in FIG. 1b. A row of thermoformed indentations is illustrated generally at 1, and an optional second row 9' is also shown in FIG. 1b. The thermoforming is conducted at the softening temperature of the multilayer films, and during the thermoforming process, the heat seal layers preferably are fused together as shown generally at 6 in FIGS. 1b and 1c.

As shown in FIG. 1c, sheet 3 defines a row of male connecting members 1 and sheet 4 defines a row of female connecting members 2. The distance that separates the male (and female) connecting members is preferably 2 to 10 millimeters, more preferably 3–7 millimeters and most preferably about 5 millimeters. As can be seen from this example, the male and female members, 1 and 2 respectively, are formed by simultaneously shaping or embossing the sheets 3 and 4. The support layer of each sheet comprises a thermoformable polymer and embossing is achieved by hot-forming using methods to be disclosed hereafter in more detail.

The sheets 3 and 4 can be between about 3 and 1000 microns in thickness, more preferably between about 10 and 50 microns. The connecting members 1 and 2 have complementary cross-sectional dimensions which mate together and fit into each other due to the single step thermoforming process which simultaneously forms both the male and the female member. When the surfaces are separated, the sheets 3 and 4 are withdrawn from each other with sequential disengagement of male and female connectors.

It is theorized that during disengagement, the male and female connecting members tend to strain and deform in the plane of the sheets which puts them out of alignment and results into a wedging effect between the respective side surfaces of said connecting members which resists the disengagement. This effect reinforces the retaining back pressure effect which results from the disconnecting pull. The contemplated combined effects perhaps explain why the binding strength of the assembling device is so effective. This assembly of the two sheets along the row of connecting members is also sufficiently tight to provide, under ambient pressure, a barrier appropriate to protect the content of a bag for instance from the influence of the outside.

In this disclosure, the term of "sheet" should be understood as including any flexible materials of any given thickness. The resistance of the assembly to separation of the sheets and also the sealing capacity through the line of connecting means can be increased by placing multiple rows of connecting means in parallel with multiple rows, each row is preferably staggered relative to that of another row. The embossed surfaces' surface area is increased, and hence the force for separating sheets from each other is also increased. The connecting members can also be given a rectangular form.

Since the mating of the male and female connecting members requires some force, the thickness of the sheet used for forming the male embossments must be sufficient to resist the effort. If the material of the sheet is too thin, its resistance can be enhanced by folding the sheet on itself in the area where the connecting members are formed.

As indicated previously, the male and female connecting members are formed by embossing at least two aligned sheets of thermoformable polymer. The simplest method to achieve embossing includes heating the area to be raised to forming temperature, placing this area in registration with a stamping matrix having in negative the shape of the desired relief, subjecting the sheet to depression on the matrix side of the sheet, this depression being sufficient to drive the softened sheets material into the hollow print in the matrix, cooling the area of the formed sheet and removing it from the matrix. This method is simple and fast. In some cases, the suction which drives the softened thermoformable material into the matrix prints can be replaced or supplemented by using a punch or positive fluid (i.e., gas) pressure which deforms the material and drives it into the matrix.

The female connecting means is made simultaneously. It is also possible to combine different forming methods to make the present connecting members, for instance combining vacuum forming and die stamping. The negative (or female) die can widened relative to the initial opening. In this way disengagement between the sheets becomes more difficult.

The heat seal layer 5 or 5' can be the same or different; critical to the heat seal layers is that they be able to fuse together as they are placed in contact with one another and thermoformed. Heat seal materials in general are well known, any of which could be used in accordance with the present invention. Such conventional heat seal materials include ethylene vinyl acetate, acid copolymers, ionomers, ultra low density polyethylene, metalocene polyethylene and the like. Preferred heat seal compositions include random copolymers derived from a major portion of ethylene and a minor portion of one or more relatively polar monomers such as:

1. ethylenically unsaturated carboxylic acid monomers (e.g., acrylic acid, methacrylic acid, crotonic acid, etc.) or the neutralized metallic salts thereof (e.g., as found in the partially neutralized ethylene/carboxylic acid copolymers which are commonly referred to in the art as ionomers);
2. vinyl esters of alkanoic acids (e.g., vinyl acetate, vinyl propionate, vinyl butyrate, etc.);
3. lower alkyl or hydroxyalkyl (e.g., C1 to about C8) esters of the aforementioned ethylenically unsaturated carboxylic acids (e.g., methyl acrylate, ethyl acrylate, hydroxyethyl acrylate, n-butyl acrylate, methyl methacrylate, ethyl methacrylate, etc.);
4. polyvinylidene chloride; and
5. derrivatives of the above.

Less preferred heat seal resins include graft modified olefin polymers, such as, high density polyethylene/acrylic acid graft copolymers, and ethylene/vinyl acetate copolymers graft modified with ethylenically unsaturated carboxylic acid monomers such as acrylic acid, maleic anhydride, etc.

The most preferred heat seal resins are derived from the addition polymerization of from about 50 to about 85 weight percent ethylene with from about 15 to about 25 weight percent of an ethylenically unsaturated carboxylic acid monomer (especially acrylic or methacrylic acid) or a vinyl ester of an alkanoic acid (especially vinyl acetate or vinyl propionate).

The most preferred heat seal materials are derrived from at least:
1. about 10 to about 98 weight parts ethylene (more preferably about 70–98 weight parts ethylene); and
2. about 2 to about 90 weight parts acrylic, methacrylic acid, maleic acid, fumaric acid, itaconic acid, or half esters of maleic, fumaric or itaconic acid (more preferably about 2 to about 30 weight parts of the unsaturated acid) wherein the resulting copolymer is wholly or partially neutralized with metal ions selected from groups Ia, Ib, IIa, IIb, IIIa, IVa, VIb and VIII of the Periodic Table of Elements; preferred such metal ions are sodium, potassium, zinc, calcium, magnesium, lithium, aluminum, nickel, and chromium; the most preferred metal ions are sodium or zinc.

The ionomers of the present invention can be prepared by polymerizing ethylene and unsaturated carboxylic acid in the presence of free radical polymerization initiator at elevated temperatures of from about 100° to about 200° C., preferably from about 140° to about 160° C. or from about 130° to about 145° C. at high pressures, e.g., at least about 140 MPa (20,000 psi) preferably from about 140 MPa (20,000 psi) to about 350 MPa (50,000 psi) followed by neutralization of the carboxylic acid groups of the resultant direct copolymer with metal ions. A suitable polymerization process is discussed in detail in U.S. Pat. No. 3,264,272, the disclosure of which patent is hereby incorporated by reference.

FIG. 1c illustrates the releasable nature of the thermoformed structure, wherein the top sheet can be pried away from the bottom sheet, such as, by allowing one sheet to overlap and extend beyond the other, thereby providing an easy gripping surface for pulling one sheet away from the other. As sheet 3 is pulled from sheet 4, the fused heat seal layers which are shown at 6 remain with only one of the sheets (sheet 4) and delaminates from the other sheet (sheet 3).

Figure 2B:
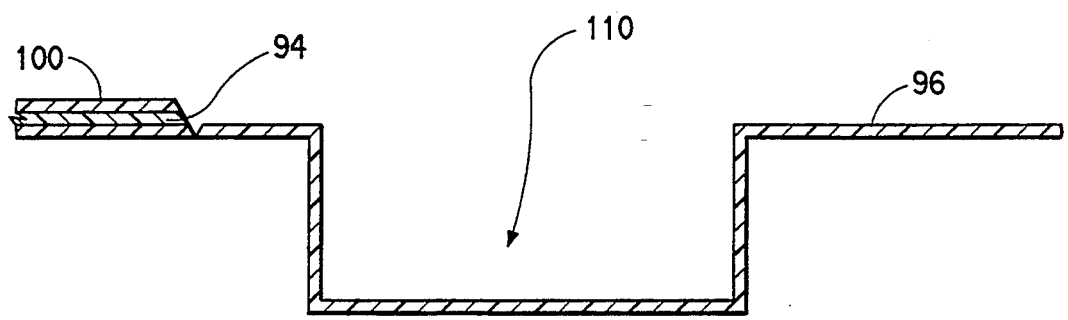
FIG. 2b is a perspective view of the embodiment of FIG. 2a subsequent to the delamination and removal of the top sheet.

FIG. 2a is a cross sectional view of a thermoformed portion of the two sheets as shown generally at 104. A notch 102 is cut through the top sheet 100 and the fused heat seal layers 94. As the top sheet 100 is pried from the bottom sheet 96, the top sheet will separate from the bottom sheet along the notch 102, and once the separation begins, it will generally continue until the top sheet (together with the combined heat seal layers) are removed from the bottom sheet support layer, as shown generally at in FIG. 2b.

To aid in delaminantion, the support layer 100 of the fully notched sheet preferably has greater adhesion to the heat seal layer 94 relative to the other sheet 96.

As shown in FIG. 2a, a first sheet 90 defines a multilayer laminate or coextrusion comprising an inner seal layer 94 which after thermoforming seals to the heat seal layer of the second sheet, thereby forming a combined heat seal layer 94. A preferred outer support layer preferably comprises polyamide, polypropylene or other material having a controlled low adhesion to the adjoining heat sealed layer 94.

The seal layers 94 preferably comprise ethylene acrylic (or methacrylic) acid copolymer partially neutralized with a cation, such as sodium or zinc; a preferred such seal material is available from E. I. du Pont de Nemours and Company under the brand name Surlyn ®1601. The seal layers are preferably about 2 to about 20 micrometers in thickness.

When the top and bottom sheets are overlapped and heated to the appropriate softening point, the contacting seal layers will fuse together. After thermoforming, the top and bottom sheets can be pulled apart. However, the seal layers will remain fused together, and delamination will occur between the fused seal layers 94 and the support layer 96 as shown generally at 110 by FIG. 2b. Critical to this embodiment of the invention therefore is that there be relatively lower adhesion between the seal layer 94 and support layer 96. Diminished adhesion can be accomplished by using a softer support material or by coating the support with a conventional release agent.

A notch 102 can be used to further separate the fused seal layers from the support layer. The two sheets can then be re-closed according to the thermoformed indentations 104 as described above.

In the present invention, the heating seal step can advantageously be combined with the thermoforming of embossed connecting elements. For removing the two assembled surface elements, the adhesive force between them must be overcome. Afterwards, the two surface elements can be reclosed due to the male and female connection elements, which will match together.

As mentioned already in the foregoing disclosure, the present assembling device is usable to close pouches, bags and to ensure the fastening of flexible lids over container of more or less rigid texture; hence it is useful as fastening means in all appliances where a releasable bond is necessary.

I claim:

1. A releasable pouch having a releasable seal, said pouch comprising:

a pair of overlapping multilayer laminates, each of said laminate comprising a plastic outerlayer with an ionomer layer bonded thereto, said ionomer layers faces each other, each of said multilayer film defining a plurality of closely spaced indentations configured substantially in a straight line along one edge of the pouch, the indentations are complementary and interconnect to form a releasable seal having a continuous wedge configuration and being spaced apart at intervals of from about 3 to about 7 millimeters, and the two ionomer layers are heat sealed together to form a middle layer between a first outer layer and a second outer layer, the middle layer comprising an ionomer, and the outer layers comprising a plastic other than an ionomer;

whereby the middle layer will delaminate from the second outer layer upon pulling the first outer layer from the second outer layer, and whereby upon pushing the two outer layers together, after they have been separated, the two layers re-engage and resist re-opening due to a continuous friction engagement.

* * * * *